April 22, 1952 — E. T. DAVIS ET AL — 2,594,133
CONTROL SYSTEM WITH DROOP CORRECTION
Filed Jan. 28, 1949 — 2 SHEETS—SHEET 1

INVENTOR.
ELWOOD T. DAVIS
WILLIAM CLARK JR.
BY Woodcock and Phelan
ATTORNEYS

Patented Apr. 22, 1952

2,594,133

UNITED STATES PATENT OFFICE 2,594,133

CONTROL SYSTEM WITH DROOP CORRECTION

Elwood T. Davis, Brookline, and William Clark, Jr., Philadelphia, Pa., assignors to Leeds and Northrup Company, Philadelphia, Pa., a corporation of Pennsylvania Application January 28, 1949, Serial No. 73,334

16 Claims. (Cl. 318—28)

1

This invention relates to systems for varying the application of an agent to control the magnitude of a condition, such as temperature, ion concentration, pressure, or other physical, chemical or electrical condition, and has for an object the provision of means for variably predetermining the extent of adjustment of droop-correcting devices regardless of the total adjustment of the condition-changing means.

The present invention is an improvement upon the control system of Davis Patent 2,300,537 in which there is disclosed the use of electrically heated resistors in a balanceable network arranged to predetermine the proportional action of the system within a predetermined throttling range. The system also included droop-corrector slidewires operable from one limit to the other in accordance with the direction and extent of unbalance of the balanceable network. While such operation of the droop-correcting slidewires is satisfactory for some applications, it has been found that additional and valuable control functions can be secured by providing means for limiting the extent of adjustment of the droop-corrector slidewires for any given adjustment of the condition-changing means.

In a preferred form of the invention, the droop-corrector slidewires or their equivalent are not only driven by a motor, as indicated in the aforesaid Davis Patent 2,300,537, but they are also manually adjustable independently of motor position, and an adjustable stop is provided for limiting as may be desired the extent of adjustment of the droop-corrector slidewires by the driving motor.

For a more detailed description of the invention and for further objects and advantages thereof, reference is to be had to the following description taken in conjunction with the accompanying drawings, in which:

Fig. 1 diagrammatically illustrates a control system in which there is shown in exploded perspective the adjusting means and mechanical stop for the droop-corrector slidewires;

Figure 1:
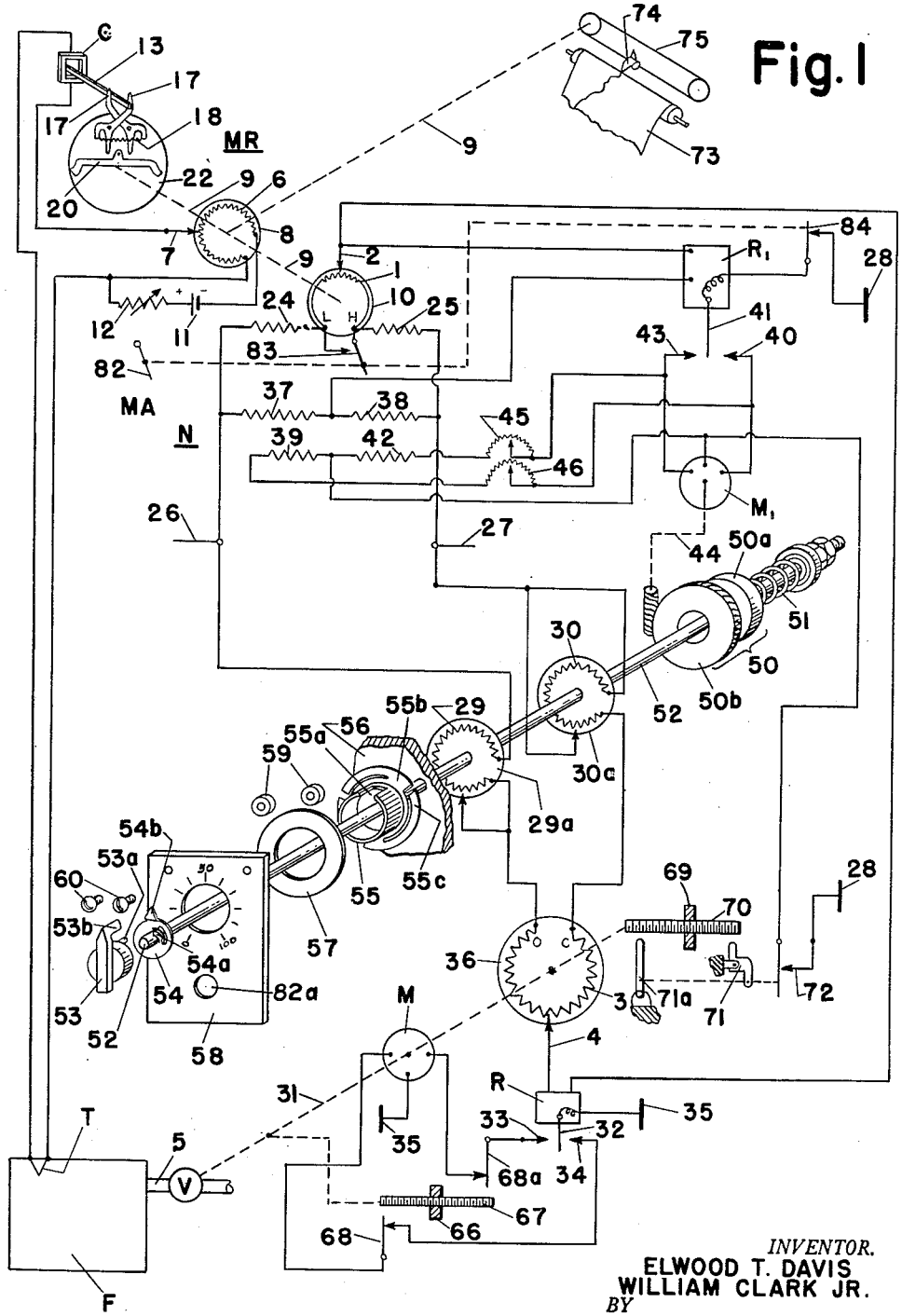

Inasmuch as the present invention has been shown as applied to the control system of Fig. 1 of the aforesaid Davis Patent 2,300,537, there

2 have been applied to Fig. 1 of the present drawings the same reference characters used in the aforesaid patent to identify certain like parts, as in Fig. 1 of those drawings. Before describing in detail the manual adjustment and mechanical stop for adjustably predetermining and limiting the degree of adjustment of the droop-corrector slidewires 29 and 30, a brief review of the operation of the system as a whole will be presented as necessary background for an understanding of the present invention.

Though the invention, as aforementioned, is applicable to the control of many conditions, the system of Fig. 1 has been illustrated as applied to the control of the temperature of a furnace F by means of a fuel valve V in fuel line 5 which valve thus is an element for controlling application of the condition-controlling agent. In such case, a thermocouple is a suitable condition-responsive element; specifically a thermocouple T is subjected to the temperature of the furnace F to produce a voltage which varies with furnace temperature. The thermocouple T is connected in a balanceable network so that the voltage thereof is balanced against the effective voltage of a potentiometer slidewire 6 powered by a battery 11 through an adjustable resistor 12. When there is an unbalance voltage as between the thermocouple T and the potentiometer slidewire 6 the galvanometer G will swing its pointer 13 to the right or the left between a pair of feelers 17, 17 periodically movable under the influence of a spring 18 to engage the pointer 13. As soon as one feeler 17 engages the pointer, the other feeler 17 angularly moves or positions a clutch member 20 relative to a clutch disc 22 for subsequent drive of disc 22, through the medium of suitable cams (not shown), to rotate the disc 8, carrying slidewire 6, for rotation of slidewire 6, relative to contact 7, in a direction to rebalance the network. The angular adjustment by the mechanical relay MR of the clutch disc 22 and shaft 9 at the same time rotates the supporting disc 10 of slidewire 1 of a second balanceable network N.

It will be convenient now to assume that the parts in Fig. 1 are in positions corresponding to a temperature of furnace F at the control point, and further, that the described operation of the mechanical relay MR will occur due to a decrease in the temperature of the furnace F. With a decrease in temperature the voltage of the thermocouple T will decrease and, hence, will be less than that derived from the potentiometer 6. Accordingly, the mechanical relay MR will operate the disc 8 in a clockwise direction. Similarly, the disc 10 will be rotated in a clockwise direction to reduce the resistance between the contact 2 and the terminal L of slidewire 1. The character L refers to the terminal of slidewire 1 corresponding with a temperature "lower" than the control point, and the character H refers to the other terminal of slidewire 1 corresponding with a temperature "higher" than the control point.

The described clockwise movement of disc 10 and of slidewire 1 unbalances the network N. A resulting unbalance voltage appears between the contact 2 of slidewire 1 and the contact 4 of slidewire 3 carried by a disc 36 and is applied to a relay R. The relay R is thereby actuated to complete a circuit from a suitable source of supply exemplified by supply line conductors 35, 35, as through stationary contact 34, for energization of motor M in a direction to move the valve V toward its open position. At the same time the motor M, as indicated by drive connection 31, rotates the disc 36 to move the slidewire 3 in a counter-clockwise direction which is in the direction for rebalance of the network N. Such counter-clockwise movement is in the direction corresponding to movement of valve V toward its open position.

If only the effect of adjustment of slidewire 3 be now considered, it will, of course, be understood that as soon as the motor M has moved the disc 36 and slidewire 3 an adequate distance, the network will again be balanced, causing the relay R to move its contact 32 to its open midposition. The opening of valve V represents a control action tending to return the temperature to its control point. But without other provisions included in the system that control action would have a drooping characteristic, which for many cases is undesirable. To compensate for the drooping characteristic there are provided the droop-corrector slidewires 29 and 30, respectively mounted on discs 29a and 30a. While such droop-correcting slidewires or resistors may alone be included in network N, it is generally desirable also to include circuit elements which provide an intermittent action, the magnitude of which is proportional to the deviation of the temperature from the control point.

These additional provisions include temperature-sensitive resistors 37 and 38 forming additional arms in the network N, and heating resistors 39 and 42 respectively in heat exchange relation with resistors 37 and 38. Upon adjustment of the slidewire 1, as previously described, an unbalance voltage appears between the contact 2 and the juncture of resistors 37 and 38. In this connection it is assumed that resistors 24 and 25 are of equal value and that resistors 37 and 38 are also of equal value at a like temperature.

The unbalance voltage is applied to a relay R₁ simultaneously with the application of the earlier described unbalance voltage to the relay R. Accordingly, the relay R₁ is energized to move its contact 41 into engagement with stationary contact 43 to energize through a circuit including adjustable resistor 45 the heating resistor 42. The heating resistor 42 elevates the temperature of the resistor 38 to increase its resistance and, thus, introduces into the network an effect tending to rebalance that part of the network N comprising the two upper branches. The rebalancing effect upon the upper two branches, which functionally comprise a balanceable network, tends to deenergize relay R₁.

While relay R₁ is energized, the closure of the circuit from a supply line 28, 28 through contact 41 and stationary contact 43 serves to energize motor M₁ to drive discs 29a and 30a in a clockwise direction to introduce additional resistance in the arm of the network including or comprising slidewire 29 and to decrease resistance in the branch including or comprising slidewire 30. Accordingly, both slidewires 29 and 30 act in directions to unbalance network N in the same direction as that produced by the adjustment of slidewire disc 10 by the mechanical relay MR. The introduction of the additional unbalancing effect results, with the temperature of the furnace F at the control point, in a final position of valve V, at subsequent balance of network N, at a position nearer its fully open position than its previous position. Thus there is compensation for the drooping characteristic above referred to.

If the departure in the temperature of furnace F were small, it will be understood that the heating resistor 42 will not elevate the temperature of resistor 38 to any great degree. However, for a substantial departure, the temperature of resistor 38 will be changed considerably to increase the resistance in its leg or branch of the network. Since the resistance change is in a rebalancing direction, relay R₁ will be deenergized before the temperature of furnace F is returned to the control point. The heater coil 42 and its associated resistor 38 thereupon begin to cool. The decrease in resistance of resistor 38 unbalances the network comprising the upper two branches, and relay R₁ will again close. There will again be an adjustment of slidewires 29 and 30 and this intermittent action continues until the temperature of furnace F is again at the control point.

If the direction of unbalance reverses, relay R₁ will operate to close a circuit through its stationary contact 40 to energize the motor M₁ in the reverse direction for counterclockwise rotation of discs 29a and 30a of slidewires 29 and 30. Such action is in a direction to unbalance the network N to energize the relay R, while energization of the heating resistor 39 initiates elevation of temperature of resistor 37 to increase its resistance and thus tend again to rebalance the network to deenergize relay R₁. The described control actions ordinarily take place with departure of the temperature of the furnace F from the control point and result in the valve V, being adjusted to a new position to supply fuel, as required, to maintain the temperature of the furnace F at the control point. It is to be understood that a rise in temperature results in control actions like those described but in reverse order.

With the foregoing general understanding of the operation of the system of Fig. 1, more detailed consideration will now be given as to what happens upon a departure in the temperature of furnace F from a predetermined, selected value, generally known as the control point, particularly as regards the return of the temperature to the control point in terms of the initiation of the droop-corrective action. More particularly, provision has been made to shift the throttling range by means of the droop-corrective action with respect to the control point. Stated more fully, the throttling range may be so shifted that any proportion thereof may be above or below the control point.

In accordance with the present invention a limitation of the aforesaid described shift in the throttling range or proportional band is accomplished by a combined manually adjustable mechanical stop and by a friction drive 50 between the motor M₁ and the slidewire discs 29a and 30a.

Though any suitable friction drive 50 may be provided, it has been shown as comprising a clutch member 50a splined to the shaft 52 and pressed by a spring 51 against a combined worm wheel and clutch element 50b. On the shaft 52 are mounted the discs 29a and 30a of slidewires 29 and 30. On the end of shaft 52 is secured an operating knob 53 having a projection 53a extending toward a pointer disc 54 for engagement with a tongue or abutment 54a, extending toward the knob 53. The pointer 54b extends radially from the disc 54 and projects through a slot 55a of a knurled operating knob 55, having secured thereto a disc 55b. The disc 55b is provided with outturned tongues or leaves 55c. The knob 55 is hollow or cylindrical and is arranged to receive therein the pointer disc 54 as well as the cylindrical portion of the knob 53.

Figure 4:
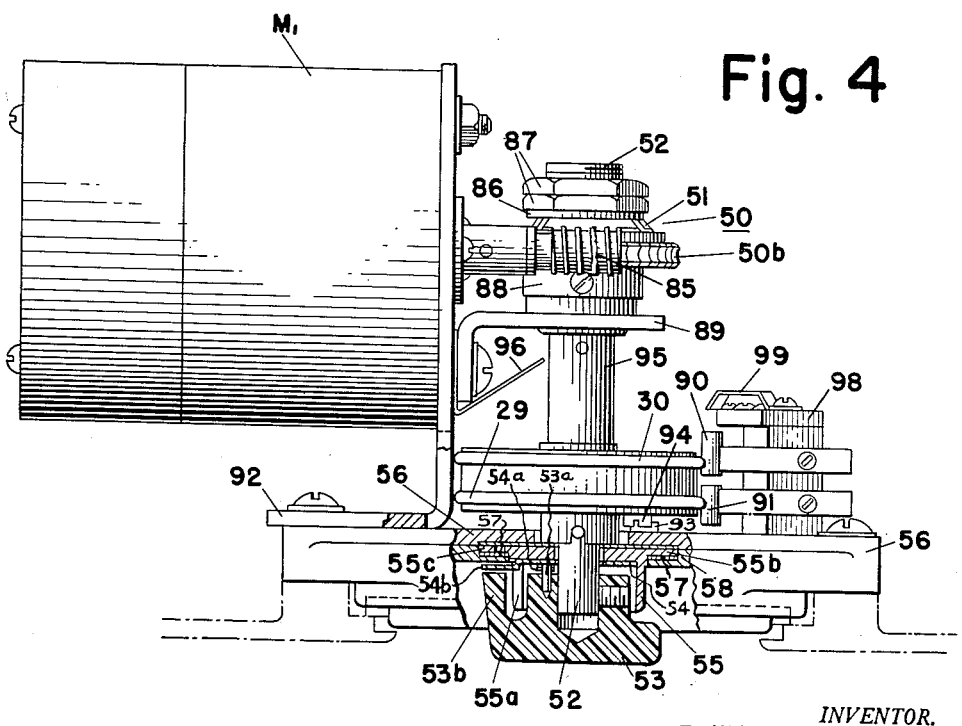
Fig. 4 is a sectional view of the assembled adjusting means.

In assembled position, Fig. 4, the disc 55b bears against a plane surface of the frame or housing wall 56. A washer-like ring 57 encircles the knurled knob 55 but is disposed behind the dial plate 58 and has a radial width great enough to cover the tongues or leaves 55c. These tongues or leaves 55c are of spring or elastic material and thus resist flattening during assembly of the parts. The extent of compression of the spring leaves 55c is determined by spacers 59, Fig. 1, interposed between the surface 56 and the back of the dial plate 58, mounting of assembly screws 60 being provided to extend through openings in the cover plate 58 into threaded openings in the surface 56 (not shown).

Assuming the parts in Fig. 1 to be in their assembled positions, it will be seen that the knob 53 may be rotated in a counter-clockwise direction directly to drive the shaft 52 to rotate the slidewires 29 and 30, this rotation being against the frictional resistance of the friction drive 50. By a suitable fixed end stop mechanism comprising members 93 and 94, Fig. 4, the allowable counter-clockwise rotation of the shaft 52 corresponds with maximum movement of slidewires 29 and 30 for inclusion of slidewire 30 in its circuit and for exclusion of slidewire 29 from its circuit. This limit of movement corresponds with the "0" marking on the scale of dial plate 58. The fixed end stop mechanism comprising members 93 and 94, Fig. 4, also determines the maximum limit of movement in the opposite direction to correspond with the "100" marking on the scale of the plate 58. It will be noted in Fig. 4 that stop member 94 may engage either side of stop member 93 depending upon the direction of rotation of the slidewides 29 and 30 thus to define their extreme limits of movement.

If the knob 53 is rotated in a clockwise direction with the parts assembled and angularly disposed as shown in Fig. 1, the projection 53a will strike against the end of tongue or abutment 54a. Further clockwise rotation of knob 53 and shaft 52 is strongly resisted by friction developed between the spring leaves 55c, the surface 56 and the ring 57. The frictional opposition is made large enough so that an operator receives the impression that he has moved the knob 53 against a solid stop. In this connection, it is to be remembered that the initial turning of the knob 53 is against the frictional opposition of the drive 50 and, thus, upon engagement of abutment 54a by projection 53a there is added the frictional opposition developed by or within the assembly associated with the knob 53.

The motor M₁ if energized in one direction or the other will also tend to drive the shaft 52 clockwise or counter-clockwise. The motor will be effective to drive the shaft 52 in a counter-clockwise direction, through its normal range of movement, limited by engagement of end stops 93 and 94, but if it rotates in a clockwise direction and drives the projection 53a against the end of tongue 54a, the friction developed by the assembly associated with the knob is too great to be overcome by the torque which may be transmitted through the friction drive 50. Accordingly, the motor M₁ cannot adjust the slidewires 29 and 30 beyond that position determined by the setting of the knurled knob 55 as shown by the pointer 54b on the scale of plate 58.

In one embodiment of the invention the friction developed in the assembly, including the spring leaves 55c, was of the order of forty ounce-inches while the friction drive 50 was adjusted to yield a torque of thirty ounce-inches. Thus, with a total torque of seventy ounce-inches on the knob 53 the impression is created of movement against a stationary stop.

In explanation of the new and novel cooperation of the described arrangement in connection with the system with which it is associated, it will be assumed that the pointer 54b has been set opposite "50" on the dial plate 58. With that setting and with the temperature of the furnace F at the control point, the valve V will be in its mid-position; that is, midway of its extreme limits of adjustment. It will be now assumed that a new and cold charge has been placed in the furnace F. The temperature of the furnace F will rapidly decrease and the valve V will be moved to its fully open position. As the valve V arrives in its fully open position, a threaded rider 66 is moved along a threaded member 67 to open limit switch 68 to deenergize the motor M. At the same time a similar rider 69 is moved by a threaded member 70 to engage a crank 71 to open a limit switch 72 to deenergize the motor M₁. Since the valve V is in open position there is maximum generation of heat in the furnace F.

It is to be further understood that upon the initial decrease in the temperature of the furnace F, the voltage of thermocouple T also decreased and the mechanical relay MR functioned to rotate the slidewires 1 and 6 in a clockwise direction. Also the motor M rotated the slidewire 3 in a counter-clockwise direction a distance corresponding with the movement of the valve V to its fully open position. As the temperature of furnace F increases the voltage of thermocouple T will rise and the mechanical relay MR will function to rebalance the measuring circuit and the rising temperature will be shown on the record chart 73 by virtue of the movement of recording pen 74, driven by a belt or violin string 75 through mechanical coupling 9 extending to the mechanical relay MR. As soon as the mechanical relay MR drives the slidewire 1 sufficiently far in a counter-clockwise direction to balance the upper branch 24—1—25 of the network against the lower branch 29—3—30, it will be understood that the relay R will be deenergized and its contact 32 will move to the open-circuit position. As the temperature continues to rise, the slidewire 1 moving relative to contact 2 will unbalance the upper and lower branches of the network N in the opposite direction to energize the relay R to complete a circuit through stationary contact 33 to energize the motor M in a valve-closing direction. On initial closing movement of the valve V by the motor M the limit switches 68 and 72 are closed. This operation occurs at the lower limit shown by the broken line 77 of Fig. 2 of the proportional band 78, the upper limit being shown by the broken line 79. The proportional band or throttling range is defined as that temperature difference which will cause movement of the valve from one extreme limit to the other.

Inasmuch as the slidewire 1 has been rotated in a clockwise direction during the decrease in temperature of the furnace F, its displacement will have unbalanced the network including the two uppermost branches 24—1—25 and 37—33 for energization, by the unbalance voltage, of relay $R_1$ to move the contact 41 against contact 43. As long as the valve V remained in its fully open position the circuit through contacts 41 and 43 remained open due to the operation of the limit switch 72. Upon initial movement of the valve V toward its closed position, as described, the limit switch 72 closes to complete the circuit through contacts 41 and 43 to energize both the motor $M_1$ to rotate slidewires 29 and 30 in the clockwise direction and to energize the heater coil 42 to elevate the temperature of resistor 38. However, the motor $M_1$ is ineffective to rotate the slidewires in a clockwise direction beyond that point where the projection 53a, Fig. 1, is against the abutment 54a and, therefore, the motor $M_1$ rotates the clutch member 50b while the clutch element 50a remains stationary due to the friction developed in the assembly, including disc 55b. In this manner the droop-correcting slidewires 29 and 30 may not be adjusted since they cannot be rotated in a direction to increase the resistance in the arm 4—26 and to decrease the resistance in the arm 4—27. However, the circuit through the rheostat 45 and the resistor 42 is effective and the resistance of resistor 38 is increased, the effect of which is in the direction to rebalance the network comprising the two upper branches. Accordingly, the heating resistor 42 will remain energized until rebalance between the two upper branches of the network.

Figure 2:
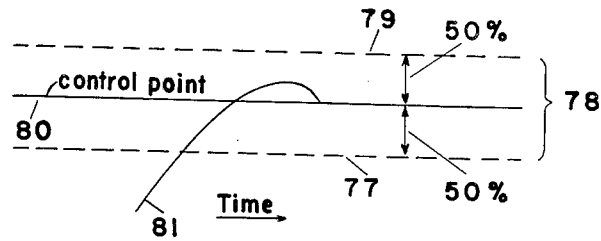
Figs. 2 and 3 are explanatory diagrams.

Returning now to the rotation of the motor M in a direction to initiate the closing movement of the valve V, it will be understood that the extent of the movement will depend upon the temperature of the furnace F. Ordinarily, when the temperature arrives at the lower limit of the throttling range the heat generated in the furnace F will carry the temperature above the lower limit so that the valve V will be operated a substantial distance toward its closed position. If the temperature has been carried above the control point, the direction of unbalance on the upper branches of the network will be reversed and the relay $R_1$ will operate to close the circuit through the stationary contact 40 to energize the heating coil 39 and to energize the motor $M_1$ to drive shaft 52 in a counter-clockwise direction. This direction of rotation will be effective through the friction drive 50 to rotate the shaft 52 for removal of resistance of slidewire 29 and to increase the resistance in the network by slidewire 30. At the same time the index 53b is moved away from pointer 54b. The effect of decreasing the resistance of slidewire 29 and increasing the resistance of slidewire 30 in the network is to produce unbalance as between the upper and lower branches in the direction for continued operation of the motor M in the valve-closing direction. However, the increase in the resistance of resistor 37 by reason of the elevation of its temperature is in a direction to rebalance the upper two branches of the network for deenergization of the relay $R_1$ to terminate the corrective action being introduced by adjustment of slidewires 29 and 30. The intermittent droop-corrector action continues until the temperature of furnace F falls to the control point, shown by the solid line 80 in Fig. 2. For a given setting of pointer 54b, the temperature is shown in Fig. 2 by the graph 81 as rising to the control point 80, overshooting the control point, and then gradually being decreased until it arrives at the control point where it remains, the control action then being effective to keep it there.

Figure 3:
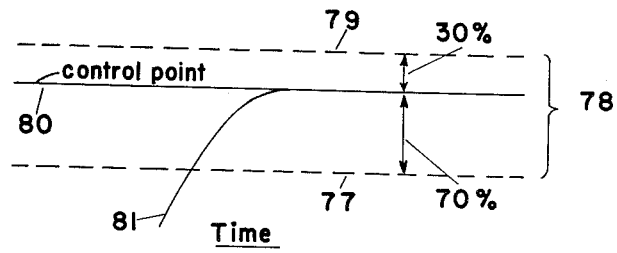

To prevent rise of the temperature of the furnace F above the control point, the knurled operating knob 55 is rotated counter-clockwise; for example, from its position at the 50% point to a position say at the 30% point. With the knob at the 50% point, the throttling range or proportioning band is equally divided above and below the control point 80, for a temperature condition as shown in Fig. 2. With the knob 55 moved to bring the pointer 54b to the 30% point, the throttling range will become effective at a lower temperature, for conditions as shown in Fig. 3, with 70% of the throttling range below the control point and 30% thereof above. In this manner, overshooting may be prevented and the temperature 81 will rise to the control point without over-shooting. On the other hand, if the load demand or the quality of the fuel should change so that the control point is reached in an undesirably long time, the knob 55 may be rotated in a clockwise direction to shift the proportional band upwardly so that the valve V will remain in its fully open position until the temperature of the furnace F more nearly approaches the control point. In the limit, with the pointer 54b set at 100%, the valve will remain open until arrival of the temperature at the control point since the proportional band will be shifted until the whole of it is above the control point.

Accordingly, it will be seen that the droop-corrector slidewires 29 and 30 perform dual functions. They compensate for droop and in conjunction with the mechanical limitation upon the extent of their adjustment in one direction, they exercise control over the maximum shift of the throttling range with reference to the control point. Moreover, with the temperature at the control point, pointer 53b in conjunction with the scale on the plate 58 indicates the position of the valve. Additionally, the setting of the pointer 54b predetermines the maximum open setting of the valve V when the temperature of the furnace first reaches the control point.

Accordingly, it will be seen that the assembly, including the scale plate 58 and the pointer 53b, yields valuable information as to the position of the valve V at the control point and, thus, provides a ready means of indicating the load demand on the system, and is in marked contrast with prior systems in which it was necessary mentally to add together the readings from two scales in order to determine the position of the valve with the temperature of the furnace at the control point.

The present invention has been particularly useful for batch processes though, of course, it is to be understood it can be used and is advantageous in continuous processes, particularly following periods of shut-down or disturbances of the process. By including a manually operable circuit controller movable from an "automatic" position A to a "manual" position M, Fig. 1, the control of the valve V may be made directly dependent upon rotation of the knob 53. The movement of the operating handle 82 of the circuit controller from the automatic position A to the manual position M closes contacts 83 to complete a by-pass circuit around the slidewire 1 and opens contacts 84 in series with the supply line 28 and the contact 41 of relay R₁. Accordingly, with the circuit controller in the manual position, the slidewire 1 is effectively removed from the circuit and the balance of the network between the upper and lower branches will depend, of course, upon the resistance values of resistors 24 and 25 which have heretofore been assumed to be equal, and upon the relative positions of slidewires 3, 29 and 30.

It will be remembered that slidewires 29 and 30 have already been assumed to be equal and if it now be further assumed that each of slidewires 3, 29 and 30 have equal maximum resistance values, any movement of the slidewires 29 and 30 will require a corresponding movement of slidewire 3 to rebalance the network. Accordingly, since slidewires 29 and 30 are operated directly by the knob 53, the valve V will be driven to readjust slidewire 3 to maintain the network in balanced condition. The result of the foregoing is that the knob 53 will not only indicate on the scale of the plate 58 the position of the valve, but rotation of the knob 53 to a new position on the scale of plate 58 will cause the valve to be moved to a position corresponding therewith. It may be moved from one of its limits to the other.

If the knurled knob 55 be rotated in a clockwise direction until the pointer 54b is at a lower indication on the scale than the pointer 53b of knob 53, it will be apparent that under either manual or automatic control it may be desirable to rotate the pointer 53b in a counter-clockwise direction. This may readily be done since the projection 53a will press axially against the abutment 54a. As soon as the projection 53a passes beyond the end of abutment 54a, the abutment will spring back into place, the position shown in Fig. 1, again to resume its function as an abutment to bring into effect the assembly which provides frictional resistance against manual or motor clockwise movement of the shaft 52 and knob 53 beyond the setting of the pointer 54b.

With the above understanding of the invention, it is to be understood that when the valve V is in the fully closed position, the traveling nut 66 will be moved to the right to open the limit switch 68a to interrupt the circuit to the motor M. At the same time the traveling nut 69 will be moved into engagement with the link 71a to open the limit switch 72, thereby to disconnect from one side of the source of supply 28 the motor M₁ and the selective circuits through contacts 40 and 43 of the heating resistors 39 and 42. In Fig. 1, the invention has been shown somewhat diagrammatically though with many of the features of a commercial embodiment of the invention clearly illustrated. A sectional elevation of such commercial embodiment is shown in Fig. 4 where it will be observed the motor M₁ drives through the worm 85 the worm wheel 50b which also forms the driving element of the clutch or friction drive 50. The spring 51 takes the form of a plurality of spring fingers such as formed in warped discs which, by means of a washer 86, are pressed by nuts 87 against the worm wheel 50b. The worm wheel 50b which is free to rotate on the shaft 52 is thereby pressed against a collar 88 secured to the shaft 52 as by a set screw. The worm wheel 50b may be made of fibre or other suitable phenolic condensation product which has been quite satisfactory for one element of the clutch or friction driving means. The spring also aids in the frictional drive by its reaction against the washer 86 which is free to turn on the shaft and which is pressed against the flat face of the adjacent nut 87. The shaft 52 is supported from a bracket 89 and from the housing 56.

The slidewires 29 and 30 have associated with them their contact fingers shown as cylindrical contact elements 90 and 91. A bracket 92 is secured to the housing 56 and as shown the central part is cut away to provide clearance for the slidewires 29 and 30. To provide the extreme limits for the rotation of the slidewires 29 and 30, one stop member 93 extends from the housing 56 into the path of the stop member 94 extending from the common disc or mounting carrying the slidewires 29 and 30. Connections to the ends of the slidewire are made by flexible conductors which may encircle a stationary bushing 95 through which the shaft 52 extends, a fibre element 96 being provided to keep the conductors in positions adjacent the disc of the slidewires. The connections are made at a terminal board 98, the portion of the conductors adjacent the connecting ends being held in place by a clamp 99. It will also be observed from Fig. 4 that the knob 53 is secured to the end of the shaft 52 by a set screw. It is to be further observed that the bushing 95 is rigidly secured to the bracket 89 and thus provides an elongated bearing surface for the shaft 52.

As shown in Fig. 1, dial plate 58 has been provided with an opening 82a so that the operating handle 82 of the manually operable circuit controller may be positioned therein and thus be in a convenient location for the operator.

While the invention has been described as applicable to the control of the furnace F, it is to be understood, of course, the invention may be applied to the control of any heat-changing means such, for example, as a cooling device, in which case suitable changes would be made in the release controlling the cooling device in order to cause greater cooling with increase of temperature and lesser cooling with decrease of temperature, the necessary changes being well understood by those skilled in the art.

While the present invention has been described and claimed in connection with the use of variable resistances in the balanceable network 1—29—30—3 for varying the action of the control system, it is intended that the term resistance be generic in scope and include a resistance, inductance or capacity.

While a preferred embodiment of the invention has been described, it has been understood that variations may be made and certain parts used without other parts, and that further modifications may be made within the scope of the appended claims.

What is claimed is:

1. In a control system the combination of a rotatable shaft, a driving motor, means including the control system for controlling the direction of rotation of said motor, a frictional device interconnecting said motor and said shaft for limiting the torque which may be applied to the shaft by said motor, circuit-adjusting means secured to said shaft, manual adjusting means for said shaft for moving it against the frictional opposition offered by said frictional device, a second frictional device supported adjacent said manual adjusting means and including an adjustable element movable relative to said manual adjusting means and engageable thereby for producing a frictional resistance against rotation of said shaft greater than the torque which may be transmitted through said first frictional device thereby to arrest motion of said shaft at any selected angular position thereof.

2. In a control system having a balanceable network for maintaining the magnitude of a condition at a control point, the combination of resistance means included in said network and adjustable in a direction to rebalance said network upon change in magnitude of said condition, droop-correcting means included in said network to correct for a drooping characteristic of the control system, means for adjusting said droop-correcting means during unbalance of a portion of said network, and means for variably limiting in one direction the extent to which said droop-correcting means may be adjusted comprising a frictional drive between said droop-correcting means and its driving means and an adjustable abutment engageable by an element driven with said droop-correcting means for preventing further adjustment thereof in said one direction.

3. In a control system having a balanceable network for maintaining the magnitude of a condition at a control point, the combination of resistance means included in said network and adjustable in a direction to rebalance said network upon change in magnitude of said condition, droop-correcting means included in said network and adjustable for correction of a drooping characteristic of the control system, driving means for adjusting said droop-correcting means actuated during unbalance of a portion of said network, a friction device interposed between said driving means and said droop-correcting means, and means for variably limiting in one direction the extent to which said droop-correcting means may be adjusted comprising adjustable means for applying to said droop-correcting means frictional opposition against movement greater than the torque which may be transmitted by said friction device.

4. In a control system having a balanceable network for maintaining the magnitude of a condition at a control point, the combination of resistance means included in said network and adjustable in a direction to rebalance said network upon change in magnitude of said condition, droop-correcting means included in said network to correct for a drooping characteristic of the control system, means including a friction driving device for adjusting said droop-correcting means during unbalance of a portion of said network, manual means for adjusting said droop-correcting means against the opposition offered by said friction driving device, an adjustable stop engageable by an element driven with said droop-correcting means, and means associated with said stop for introducing opposition to movement greater than the torque which may be transmitted by said friction driving device for variably limiting in one direction the extent to which said droop-correcting means may be adjusted and providing for movement thereof upon reversal of adjustment of said droop-correcting means.

5. In a control system the combination with a condition-changing control element operable between predetermined limits to maintain the magnitude of a condition at a control point, of a balanceable network including a variable impedance having an element adjusted in response to change in magnitude of the condition to be controlled, a second variable impedance having an element adjusted in accordance with adjustment of said control element, said variable impedances establishing a predetermined throttling range with respect to the control point, droop-correcting means included in said network to correct for a drooping characteristic of the control system, a second balanceable network including said first-named variable impedance for defining said control point, means responsive to unbalance of said second network for adjusting said droop-correcting means to correct for said drooping characteristic, and means associated with said droop-correcting means for shifting the throttling range so that it will be divided in any desired ratio above and below the control point comprising cooperating structures one of which is driven by said adjusting means for variably limiting in one direction only the extent to which said droop-correcting means may be adjusted.

6. In a control system having a balanceable network for maintaining the magnitude of a condition at a control point, the combination of resistance means included in said network and adjustable in a direction to rebalance said network upon change in magnitude of said condition, droop-correcting means included in said network and adjustable for correction of a drooping characteristic of the control system, driving means for adjusting said droop-correcting means, a clutch device interposed between said driving means and said droop-correcting means, and means for variably limiting in one direction the extent to which said droop-correcting means may be adjusted comprising adjustable mechanical means for applying to said droop-correcting means frictional opposition against movement greater than the torque which may be transmitted by said clutch device.

7. In a control system having a balanceable network for maintaining the magnitude of a condition at a control point, the combination of droop-correcting means included in said network and adjustable for correction of a drooping characteristic of the control system, driving means for adjusting said droop-correcting means, a friction device interposed between said driving means and said droop-correcting means, and means for variably limiting in one direction the extent to which said droop-correcting means may be adjusted comprising a first pointer having a projection thereon and driven with said droop-correcting means in response to adjustment thereof, a second pointer supported adjacent said first pointer for indicating the limit to which said droop-correcting means may be adjusted, said second pointer having associated therewith a mechanical stop engageable with said projection, and frictional resisting means cooperating with said stop for applying to said droop-correcting means frictional opposition against movement greater than the torque which may be transmitted by said friction device.

8. A control system including droop-correcting means to correct for a drooping characteristic of said control system, means for adjusting said droop-correcting means, and means for variably limiting in one direction the extent to which said droop-correcting means may be adjusted comprising a clutch member between said droop-correcting means and its driving means, a first pointer driven with said droop-correcting means for indicating the position thereof, a second pointer cooperating with a manually operable element both of which are positioned in concentric relation with said first pointer, an indicating scale cooperating with said pointers, said element having a frictional means for resisting rotation of said element and said second pointer, and an abutment cooperating with said element and said second pointer engageable by a projection on said first pointer for preventing further adjustment of said droop-correcting means in said one direction.

9. A system for controlling the position of a control member adjustable to vary the supply of an agent affecting the magnitude of a condition comprising two balanceable networks unbalanced by change in magnitude of said condition, one of said networks including droop-correcting resistances and a resistance mechanically coupled to said control member, means responsive to unbalance of the other of said networks for effecting rebalance thereof and concurrently adjusting said droop-correcting resistances to shift the balance point of said one of the networks, means responsive to unbalance of said one of the networks for adjusting said control member and said resistance coupled thereto, means preset to limit in one direction the extent of adjustment of said droop-correcting resistances, and switching means operated at a predetermined position of said control member to disable said first responsive means.

10. A system for controlling the position of a control member adjustable to vary the supply of an agent affecting the magnitude of a condition comprising two balanceable networks unbalanced by change in magnitude of said condition, one of said networks including droop-correcting resistances and a resistance mechanically coupled to said control member, and the other of said networks including temperature-sensitive resistances, means responsive to unbalance of said other network for selectively heating said temperature-sensitive resistance and concurrently adjusting said droop-correcting resistances, means preset to limit in one direction the extent of adjustment of said droop-correcting resistances, means responsive to unbalance of said one of the networks for adjusting said control member and said resistance coupled thereto, and switching means operated at a predetermined position of said control member to disable said first responsive means.

11. In a control system for maintaining the magnitude of a condition at a control point, a balanceable network unbalanced by change in magnitude of said condition, resistance means included in said network, driving means for adjusting said resistance means in direction to rebalance said network upon change in magnitude of said condition, droop-correcting means included in said network, means for adjusting said droop-correcting means between limits in direction further to unbalance said network to produce further adjustment of said resistance means, and an adjustable abutment for variably limiting in one direction the extent to which said droop-correcting means may be adjusted by its said adjusting means from one of said limits toward the other of said limits.

12. In a control system for maintaining the magnitude of a condition at a control point, a balanceable network unbalanced by change in magnitude of said condition, resistance means included in said network, means for adjusting said resistance means in direction to rebalance said network upon change in magnitude of said condition, droop-correcting resistance included in said network to correct for a drooping characteristic of the control system, means for adjusting said droop-correcting resistance, and mechanical means preset to limit in one direction the extent of adjustment of said droop-correcting resistance by its said adjusting means.

13. In a control system including a condition-responsive element and an element controlling the application of a condition-controlling agent, means producing actuation of said controlling element proportional to actuation of said responsive element, droop-correcting means for adjusting the relation of said controlling element with respect to said responsive element within predetermined fixed limits, means operable to adjust said droop-correcting means within said fixed limits, and manually actuable limiting means operable to effect an unsymmetrical shift in said fixed limits.

14. In a control system including a condition-responsive element and an element controlling the application of a condition-controlling agent, means producing actuation of said controlling element proportional to actuation of said responsive element, droop-correcting means for adjusting the relation of said controlling element with respect to said responsive element within predetermined extreme limits defined by stop elements, means operable to adjust said droop-correcting means within said predetermined extreme limits, and an adjustable stop member manually adjustable between said extreme limits effectively to replace one of said stop elements, the stop element defining the other of said extreme limits remaining substantially stationary.

15. In a control system including a condition-responsive element and an element controlling the application of a condition-controlling agent, means producing actuation of said controlling element proportional to actuation of said responsive element, droop-correcting means for adjusting the relation of said controlling element with respect to said responsive element within predetermined extreme limits, means operable to adjust said droop-correcting means within said predetermined extreme limits, and a stop member adjustable between said predetermined extreme limits of operation of said droop-correcting means for arresting operation of said droop-correcting means at a predetermined adjusted position of said controlling element relative to said responsive element as said responsive element approaches a predetermined value of a controlled condition.

16. In a control system for maintaining the value of a condition at a predetermined control point, the combination including a condition-responsive element and an element controlling the application of a condition-controlling agent, means for producing actuation of said controlling element proportional to actuation of said responsive element, droop-correcting means for adjusting the relation of said controlling element with respect to said responsive element within predetermined extreme limits, means operable to adjust said droop-correcting means within said predetermined extreme limits, a stop member adjustable between said predetermined extreme limits of operation of said droop-correcting means, a scale associated with said adjustable stop member, and index means actuated with said droop-correcting means, said index means cooperating with said adjustable stop member and said scale for indicating a maximum adjusted position of said controlling element when the controlled condition is at the control point.

ELWOOD T. DAVIS.
     WILLIAM CLARK, Jr.

REFERENCES CITED

The following references are of record in the file of this patent:

UNITED STATES PATENTS

| Number | Name | Date |
|---|---|---|
| 2,173,798 | Baak | Sept. 19, 1939 |
| 2,300,537 | Davis | Nov. 3, 1942 |
| 2,365,709 | Lilja | Dec. 26, 1944 |
| 2,371,732 | Bristol | Mar. 20, 1945 |
| 2,416,257 | Isserstedt | Feb. 18, 1947 |